L. BLOCK.
MANUFACTURE OF NON-ALCOHOLIC MALT BEER.
APPLICATION FILED JULY 10, 1915.
1,271,269.
Patented July 2, 1918.
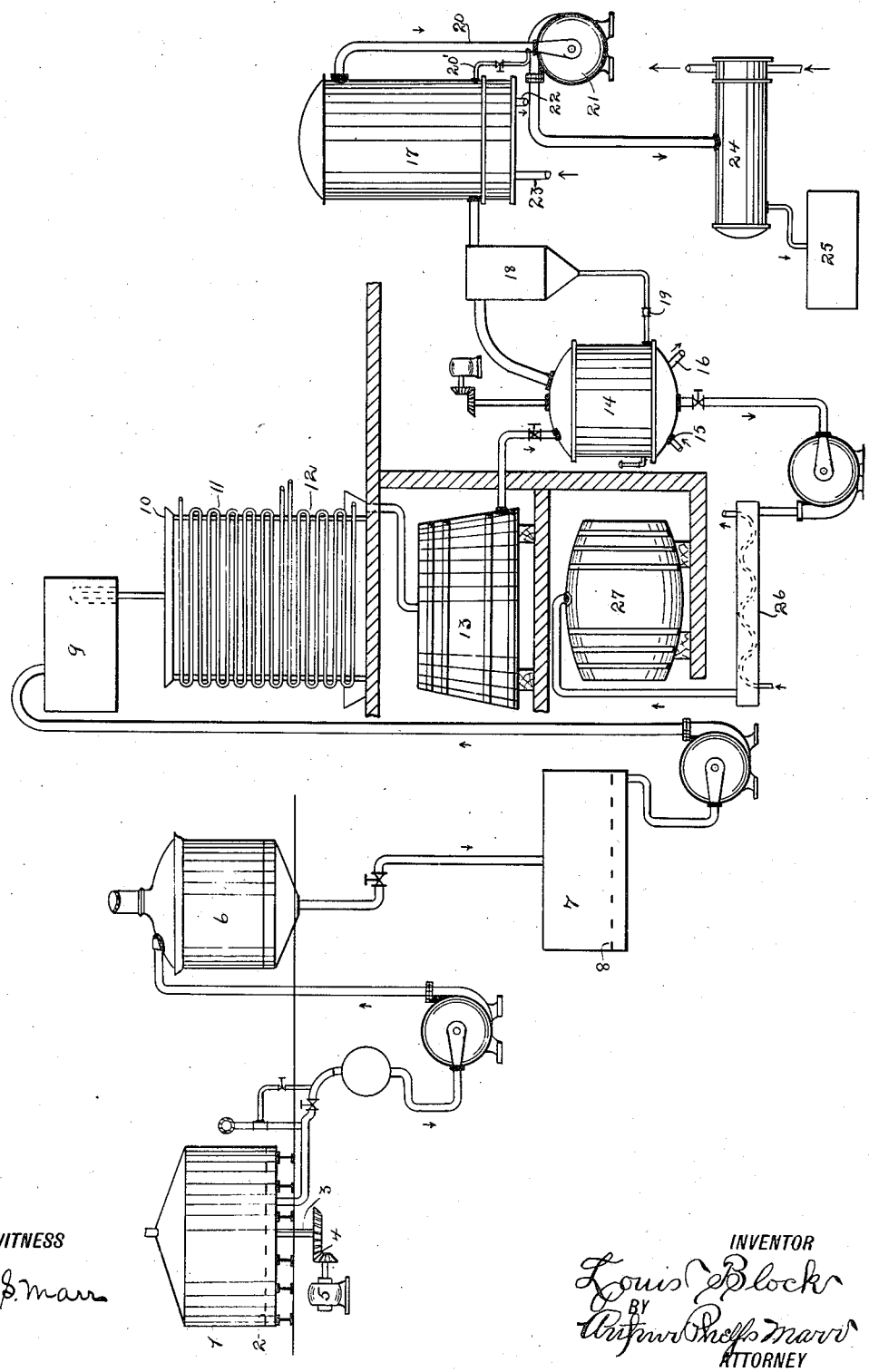
WITNESS
INVENTOR
Louis Block
BY
Arthur Phelps Marr
ATTORNEY

UNITED STATES PATENT OFFICE.

LOUIS BLOCK, OF MAMARONACK, NEW YORK.

MANUFACTURE OF NON-ALCOHOLIC MALT BEER.

1,271,269.  Specification of Letters Patent.  Patented July 2, 1918.

Application filed July 10, 1915. Serial No. 39,094.

*To all whom it may concern:*

Be it known that I, LOUIS BLOCK, a citizen of the United States, and resident of the town of Mamaronack, county of Westchester, State of New York, have invented certain new and useful Improvements in the Manufacture of Non-Alcoholic Malt Beer, of which the following is a specification.

The object of the invention is the production of a beverage similar in taste and character to that known in the art as lager beer with the difference that what I now refer to as malt beer shall contain no alcohol or only a very small percentage thereof, while its nutritious and refreshing qualities are practically the same as that of lager beer. I shall now describe the process of manufacture so that others versed in the art may understand and follow it.

The first steps in my process are in a general way the same as employed in the manufacture of lager beer or ale. I mash the malt, malt adjuncts or cereal products, boil the wort, cool it and ferment it. The fermented extract usually contains from three to six per cent. of alcohol; three per cent. for lager beer and about six per cent. for ale.

From this point until a finished beverage has been produced my process varies considerably from that employed in the brewing or manufacturing of lager beer or ale.

I may run the fermented wort or extract from the fermenting tubs into other tubs or vats located in a room kept at a low temperature, say thirty-two degrees Fahr., and hold it there for several days, in order to, as far as possible, precipitate albuminoids, hop resins and yeast, still contained in the liquid but this is not absolutely necessary in carrying out my process. I will hereafter call the fermented wort beer, although it has to pass through several stages before it is entitled to that name.

I now take the beer, after the main or primary fermentation has ceased and the yeast is separated, and transfer the liquid, now practically free from yeast, into an evaporator 14, a vessel of any convenient or suitable shape and built so as to resist a high internal vacuum. This vessel may be equipped with a coil or other means for heating the contents and may also be provided with means for agitating the liquid contained therein. The heating may be accomplished by warm water, the temperature of which is predetermined and controllable, flowing through tubes or a coil contained in the evaporator and connected to the pipes 15 and 16, or the evaporator may have a double bottom through which hot water may be passed. It is my intention to prevent any part of the beer from coming in contact with very hot surfaces, and to prevent its temperature from rising, but slightly, if any, beyond the temperature which it attained during fermentation.

To any convenient spot above the liquid level in the evaporator, I connect a surface condenser 17, which may be of the usual form but I prefer to have it in a vertical position, and between the evaporator and condenser a separator 18 is interposed for the purpose of intercepting any entrained moisture, which may pass over with the vapor, and for returning it through the check valve 19 to the evaporator. The vapor pipe 20 leading from the condenser is connected to the suction inlet of a vacuum pump 21, and I circulate a refrigerant through the tubes of the condenser with their inlet at 23 and their outlet at 22, and produce a temperature in the condenser which will enable me to obtain a high vacuum, say 28½ or 29 inches. I heat the contents of the evaporator to 60 or 65 degrees Fahr. or other temperature which may correspond to the vacuum to be produced and I circulate the refrigerant through the coils or tubes of the condenser at a temperature which will cause the temperature in the condenser to drop to 32° Fahr. or lower; and then I start the air pump and produce and maintain the necessary vacuum.

At this vacuum and with the temperatures maintained as here set forth, the alcohol will leave the beer and will pass into the condenser where it will be condensed. The air and such small part of the alcohol vapor as is not condensed will flow through pipe 20 to the air pump, whence it will be discharged into a secondary condenser or cooler 24, from which it can be drawn off into a tank 25 for subsequent treatment.

The condensate which is not frozen on the condenser tubes because it is too high in alcohol content, flows through the pipe 20′ to the vacuum pump and serves to seal the pump.

I regard the low temperature in the condenser 17 essential, because it makes it possible to obtain a high vacuum in the evaporator and in the condenser without unusual effort of the air pump. It also prevents, to a great extent, water vapor from reaching the air pump. The uncondensed alcohol vapor which reaches the pump is in saturated condition, the air is at a density corresponding to the low temperature, and its moisture content is low. For this reason I prefer to resort to artificial cooling, and while I very well know that this is expensive, I regard the benefit derived as outweighing the expense.

After withdrawing all or nearly all of the alcohol from the beer, I cool it, preferably by means of a Deckebach or other closed cooler 26, and then after subjecting it to secondary or aging fermentation I convey it into chip casks 27 in a room maintained at a low temperature, say 32 degrees Fahr. in order to carbonate the beer. I may do this by kräusening which consists of adding to the nearly completed product in the chip cask, a quantity of the liquid that has just started fermenting in the starting tub or fermenting vat, and leaving the bunghole of the cask open. The beer will begin to work and generate carbonic acid gas, and after it has worked out through the bunghole for about three days, the cask being kept constantly full, finings such as isinglass are added, the cask is bunged down and the contents allowed to come to a pressure of from five to six pounds per square inch, or more or less. In this condition it should remain for a period of time preferably not less than four weeks, during which time it will become thoroughly carbonated and ready to be filtered and racked off; that is, drawn into the trade packages. If I do not desire to resort to the process of kräusening above described, I may carbonate the beer by charging it with carbonic acid gas under pressure and while the beer is cold.

I do not confine myself to the use of barley malt only, in the production of the wort, but may use what are called in the art, malt adjuncts, such as unmalted cereals, rice, corn grits, corn meal; or cereal products, such as refined grits, corn flakes, etc. I may also use saccharine materials such as sugar or glucose, in certain proportions.

My aim is to produce a palatable, nutritious, and refreshing beverage with a low alcoholic content from fermented sugar solution and whether the latter is obtained from barley malt grist or other grist containing convertible starch is immaterial.

I may clarify the liquid before it is passed into the evaporator, by settling, but I do not feel that this is entirely necessary.

I do not confine myself to the gravity of the wort, I may make it heavy or light; nor do I confine myself to any particular vacuum or temperature in the evaporator or still as I may vary the vacuum to suit the gravity of the wort.

Other modifications may be made within the scope of the appended claims without departing from the principle or sacrificing the advantages of this invention.

Having carefully and fully described my invention to the best of my ability, what I claim and desire to secure by Letters Patent is:

1. The process of manufacturing a malt beverage which includes the extracting of the alcohol at approximately the temperature of and directly after the main fermentation.

2. The process of manufacturing a malt beverage which includes the extracting of the alcohol under a vacuum and at approximately the temperature of and directly after the main fermentation and before the secondary or aging fermentation.

3. The process of manufacturing a malt beverage which includes the extracting of the alcohol under a vacuum and at approximately the temperature of and directly after the main fermentation, then kräusening and filtering it.

4. The process of manufacturing a malt beverage which includes the extracting of the alcohol at approximately the temperature of and directly after the main fermentation then cooling and carbonating it.

5. The process of manufacturing a malt beverage which includes the extracting of the alcohol at approximating the temperature of, and directly after the main fermentation then cooling the beverage and subjecting it to an aging fermentation, carbonating, and filtering it.

6. The process of manufacturing a malt beverage which includes the extraction of the alcohol under a vacuum and directly after the main fermentation has ceased, and while supplying heat to the liquid to maintain a temperature corresponding to the vacuum produced.

Signed at New York city, county and State of New York, this 2nd day of July, 1915, in the presence of these two witnesses.

LOUIS BLOCK.

Witnesses:
G. E. S. Marr,
Arthur Phelps Marr.